United States Patent Office 3,303,728
Patented Feb. 14, 1967

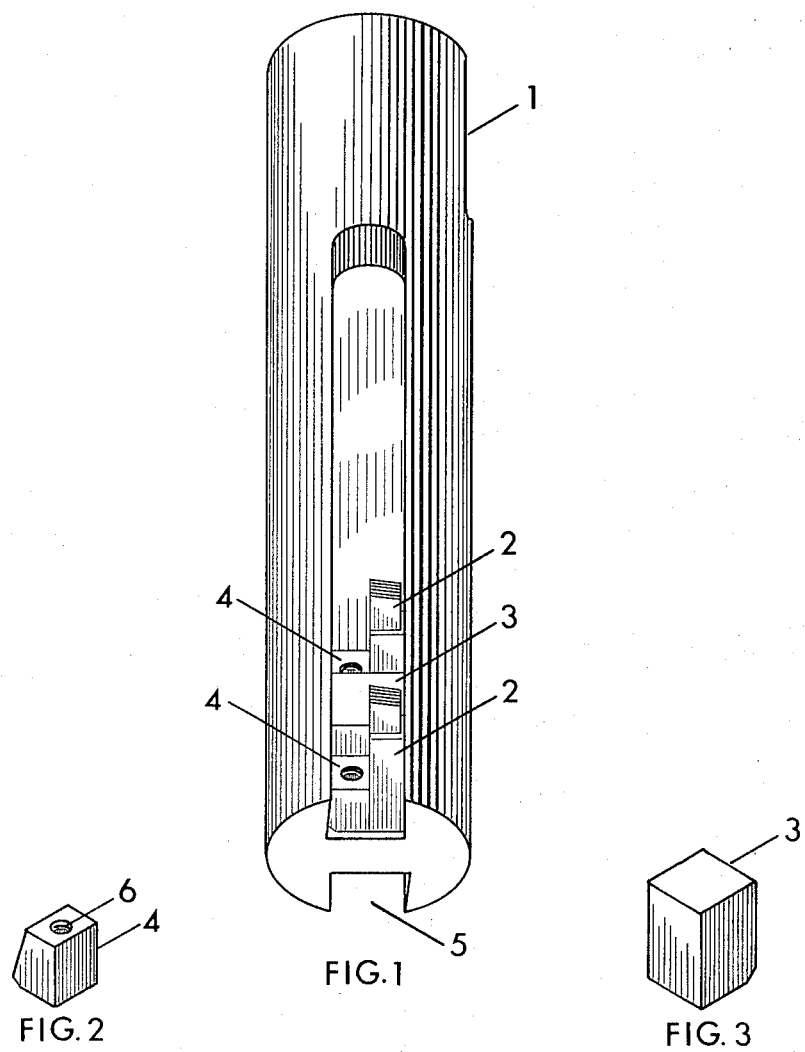

3,303,728
MULTIPLE BIT BORING BAR
Ernest J. Testa, Santa Fe Springs, Calif., assignor to Tesan Tool Manufacturing Company, Santa Fe Springs, Calif.
Filed Apr. 27, 1965, Ser. No. 451,238
1 Claim. (Cl. 77—58)

This invention relates to boring bars and more specifically to that type of boring bar that may be used on machine tools such as a lathe, turret lathe, boring mill and the like. More particularly, this invention relates to the type of multiple bit boring bar that can be employed to bore more than one diameter in a single operation.

Heretofore many types of multiple bit boring bars have been utilized, most of these bars being of a type specially made with tool bit holes fixedly spaced along its length, each hole being at a predetermined point to suit the multiple bore depths and diameters of a particular workpiece. Since the tool bit holes are fixed, and their positions cannot be readily changed, this type of boring bar can only be used on the particular workpiece that it was specially made for.

Still another type of prior art multiple bit boring bars incorporate a series of cutting tool bit holding cartridges that are slidably mounted in changeable positions in a longitudinal slot on the bar. The design on these are such that the cartridges are not held rigidly enough to prevent chatter during a heavy cut. Still another disadvantage is that, in some cases, although two or more cartridges may be adjacent to each other, the tool bits may still be further apart to a degree greater than that which is required for the depth spacing of adjacent bores in the workpiece. Still another disadvantage of this prior art multiple bit boring bar is that they require special, and therefore, expensive cutting tool bits.

It is, accordingly, an object of the invention to provide a multiple bit boring bar incorporating a multiple of longitudinal grooves which each may receive one or more cutter bits, and which bits may be accurately and independently located anywhere within the longitudinal groove length and removably locked in position by independent wedges.

A further object of the invention is the provision of a multiple bit boring bar incorporating independent support spacers that can be locked into positions against two opposite sides of the cutter bits with an independent wedge for each spacer so that the cutter bit may be removed without disturbing the spacers and a replacement cutter bit inserted into the same exact preset linear position.

Another object of the invention is the provision of a multiple bit boring bar incorporating the use of standard cutter bits that may be drilled and tapped at their shank end so as to receive a set screw that provides the means for presetting the cutter bits to a diametral dimension.

Still a further object of the invention is the provision of a multiple bit boring bar that provides the means of locating cutter bits in a manner allowing infinite linear related bore depths.

Further objects and advantages of the invention will be apparent from the following description of the accompanying drawing wherein:

FIG. 1 is a perspective view of the boring bar showing two longitudinal grooves, one of which contains a cutter bit, spacers and wedges.

FIG. 2 is a perspective view of a spacer.

FIG. 3 is a perspective view of a wedge.

FIG. 4 is a perspective view of a cutter bit.

With continued reference to the drawing there is shown a boring bar 1 which is of circular cross section but other cross section may be used if desired. Slots 7 are formed in the length of bar 1 so that they are open at one end of the bar and are closed proximate to the opposite end. However, slots 7 may be formed the entire length of the bar if desired. Two slots 7 are shown. However, more or less slots may be formed if desired. Slots 7 are formed so that the bottom and one wall of the slot are square, or ninety degrees to each other. The opposite wall of the slot is at an angle, somewhat less than ninety degrees to the bottom of the slot so that the two opposing walls result in that the slot top opening width is smaller than the width of the slot bottom which connects the two opposing walls. Both opposing walls of slots 7 are parallel to each other longitudinally so that the width of the slot bottom is constant and the top opening width is also constant for the slot length.

Cutter bit 3 is of a standard brazed carbide tipped type. It is shown in FIG. 4 having a set screw 6 inserted in one end to provide a means of adjusting the set screw so that a specific overall length from the outside end of the set screw to the cutting end is obtained.

Wedge 2 is formed having four sides and two ends, the two ends being parallel to each other and the three connecting sides are ninety degrees, or square, to each other and to both ends. The fourth side of wedge 2 is at an angle, or taper, so that one end is wider in width than the opposite end. The tapered side of wedge 2 is formed parallel in one direction with the opposite side so that the width of the narrow end of wedge 2 is constant and the width of the wide end is constant. Wedge 2 is also provided with a threaded hole through its length so that the threaded hole is parallel to the three square sides. Set screw 5 is contained by this threaded hole.

Spacer 4 is approximately the same size square as is the shank of cutter bit 3. Spacer 4 may also be in various shapes, such as a rectangle, if desired.

Tool bit 3 is placed into slot 7, at any desired linear location, so that the end of set screw 6 is contacting the bottom of slot 7. The side of tool bit 3, opposite the cutting face side, is placed against the slot 7 wall that is square to the slot bottom. Wedge 2 is placed into slot 7 so that the tapered side of the wedge is adjacent to the tapered wall of slot 7, and the opposite square side of the wedge is adjacent to tool bit 3. The wide end of wedge 2 is towards the bottom of slot 7, and the narrow end of wedge 2 is towards the slot 7 longitudinal opening. The combined width of tool bit 3 and wedge 2 is somewhat less than the width of slot 7. Set screw 5 is of a right hand thread. By tightening set screw 5, with a standard hex key wrench, in a clockwise direction, the set screw will contact the bottom of slot 7 and force the wedge 2 towards the slot 7 narrow opening, causing a tight wedging action against the tool bit 3, and thereby rigidly locking it in place. In order to support the tool bit for heavy cuts a spacer 4 may be placed adjacent to each of the two sides of tool bit 3 as shown in FIG. 1, a wedge 2 is tightened against each of the spacers and thus locking the spacers securely in place.

The tool bit 3 may be removed from the slot 7 by turning set screw 5 in a counterclockwise direction, thereby drawing the end of the set screw away from the bottom of slot 7. The wedge 2 can then be tapped downward, or towards the bottom of slot 7, thereby loosening the wedge from the tool bit. The tool bit may then be removed without disturbing the setting of the adjacent spacers 4 and their restraining wedges 2. Another tool bit, that may be diametrally preset by its set screw, can be placed between the two spacers and quickly locked into place with the wedge. Thus, tool bits may be quickly changed into a preset diameter and linear position.

Although a set of only one tool bit and supporting spacers with wedges are shown, multiple sets can be placed into each slot 7 so that a multiple number of bore diameters and depths can be formed in a workpiece during a single operation.

It will be obvious, to those skilled in the art, that various changes may be made in the invention without departing from the spirit and scope thereof and, therefore, the invention is not limited by that which is shown in the drawing and described in the specification, but only as indicated in the appended claim.

What I claim is:

A multiple bit boring bar comprising an elongated bar of circular or otherwise cross section, an open slot formed lengthwise on the surface of said bar, said slot having one wall square, or 90 degrees to its bottom surface, and the opposite wall formed somewhat less than 90 degrees to its bottom surface so that the width of said slot is smaller at its lengthwise opening than the width of said slot at its lengthwise bottom, cutting tool bits removably placed into said slot at desired positions within slot length, said tool bits locked into positions with tapered wedges, a set screw threadedly received in said wedge whereby said set screw is tightened in a clockwise direction causing contact of the said set screw end against said slot bottom and actuating said wedge into tight engagement between said tool bit and said tapered wall of said slot, supporting spacers removably placed into said slot adjacent to said tool bits, said spacers locked into position by said wedges in the same manner as the said tool bits.

References Cited by the Examiner
UNITED STATES PATENTS

| 846,196 | 3/1907 | Freas | 29—105 |
| 1,049,589 | 1/1913 | Mitchell | 29—105 X |

WILLIAM W. DYER, Jr., *Primary Examiner.*

G. A. DOST, *Assistant Examiner.*